(12) United States Patent
Marks et al.

(10) Patent No.: US 7,733,037 B2
(45) Date of Patent: Jun. 8, 2010

(54) INTEGRATED SKID WITH MULTIPLE-MOTOR CONTROLLER

(75) Inventors: Kenneth Marks, Southwick, MA (US); Douglas A. Parsons, Canton, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1193 days.

(21) Appl. No.: 10/816,092

(22) Filed: Apr. 1, 2004

(65) Prior Publication Data

US 2005/0218841 A1 Oct. 6, 2005

(51) Int. Cl.
*H02P 5/46* (2006.01)
(52) U.S. Cl. .......................................... 318/59; 318/66
(58) Field of Classification Search ............ 318/34–113
See application file for complete search history.

(56) References Cited

U.S. PATENT DOCUMENTS

| | | | |
|---|---|---|---|
| 5,130,616 A | | 7/1992 | Owen et al. |
| 5,619,111 A | * | 4/1997 | Katagiri et al. ............. 318/625 |
| 5,638,387 A | * | 6/1997 | Palleggi et al. ................ 318/67 |
| 5,670,856 A | | 9/1997 | Le et al. |
| 5,876,370 A | * | 3/1999 | Blomquist .................... 604/65 |
| 6,553,770 B2 | * | 4/2003 | Tisdale et al. ................. 60/772 |
| 6,684,788 B2 | * | 2/2004 | Ohno et al. .................. 101/484 |
| 6,731,089 B2 | * | 5/2004 | Cho et al. .................... 318/560 |
| 6,771,032 B2 | * | 8/2004 | Cox-Smith et al. ............ 318/85 |
| 6,812,656 B2 | * | 11/2004 | Donnelly et al. .............. 318/66 |
| 6,825,634 B2 | * | 11/2004 | Tatar et al. ................... 318/625 |
| 6,933,698 B2 | * | 8/2005 | Miura et al. ................. 318/625 |
| 2003/0020421 A1 | * | 1/2003 | Vu et al. ..................... 318/442 |
| 2003/0200060 A1 | | 10/2003 | Eryurek et al. |
| 2003/0231875 A1 | | 12/2003 | Masino |

FOREIGN PATENT DOCUMENTS

WO WO 01/59288 8/2001

OTHER PUBLICATIONS

European Search Report, Oct. 5, 2005.

* cited by examiner

*Primary Examiner*—Bentsu Ro
*Assistant Examiner*—Erick Glass
(74) *Attorney, Agent, or Firm*—Carlson, Gaskey & Olds

(57) ABSTRACT

An integrated skid system integrates the functions of multiple skids into a single skid to reduce the skid footprint and the complexity of the overall system. A multi-motor controller monitors the devices on the integrated skid to maintain proper temperature, pressure and current draw in the devices. Base on this information, the multi-motor controller can make decisions on faults and fault accommodation and communicate with a main controller regarding the operating states of the skid devices via a single serial or Ethernet-type connection.

6 Claims, 3 Drawing Sheets

INTEGRATED SKID WITH MULTIPLE-MOTOR CONTROLLER

TECHNICAL FIELD

The present invention is directed to fluid handling systems, and more particularly to a skid layout and control system that controls multiple motors in the system.

BACKGROUND OF THE INVENTION

Industrial power plant systems often use gas turbine accessories having several isolated skids linked to a central system controller, each skid carrying various engine components directed to a particular function (e.g., gas turbine bearing lubrication, main electrical generator lubrication, liquid fuel pumping and metering, water injection, hydraulic pumping and control valves, etc.). Each skid may contain a plurality of devices, such as motors, pumps, values, filters, pressure and temperature sensors, thermal controls and other devices that communicate with a central system controller. However, the system controller may be located at a central location away from the skids, requiring a multitude of connections via wires to link the devices to the system controller. These connections between the multiple skids and the system controller are often complicated and costly. The multiple skids also increase the skid footprint in the power plant system, increasing the space and cost needed to implement the system.

Moreover, the lubrication systems in such an arrangement usually contain three motors and pumps (e.g., two AC motors and one DC motor) to ensure operational availability and safety in case of an emergency shut down. These additional features further increase the complexity of the overall power plant system, causing high installation and commissioning costs.

There is a desire for a power plant system that is simpler and more cost-effective to implement.

SUMMARY OF THE INVENTION

The present invention is directed to an integrated skid and a multi-motor controller that integrates the functions of multiple skids into a single skid, thereby reducing the skid footprint and the complexity of the overall system. All of the devices on the integrated skid are monitored and controlled by the multi-motor controller to maintain proper temperature, pressure and current draw in the devices. Base on this information, the multi-motor controller can make decisions on faults and fault accommodation and communicate with a main controller regarding the operating states of the skid devices via a single serial or Ethernet-type connection, eliminating a significant amount of wiring. The multi-motor controller therefore provides redundant and fault-tolerant operation of the devices in the integrated skid without requiring actual redundancy in the skid devices themselves.

In one embodiment, the multi-motor controller can operate from either AC power or DC power, eliminating the need for separate DC motors and pumps in the system.

DETAILED DESCRIPTION OF THE EMBODIMENTS

Figure 1:
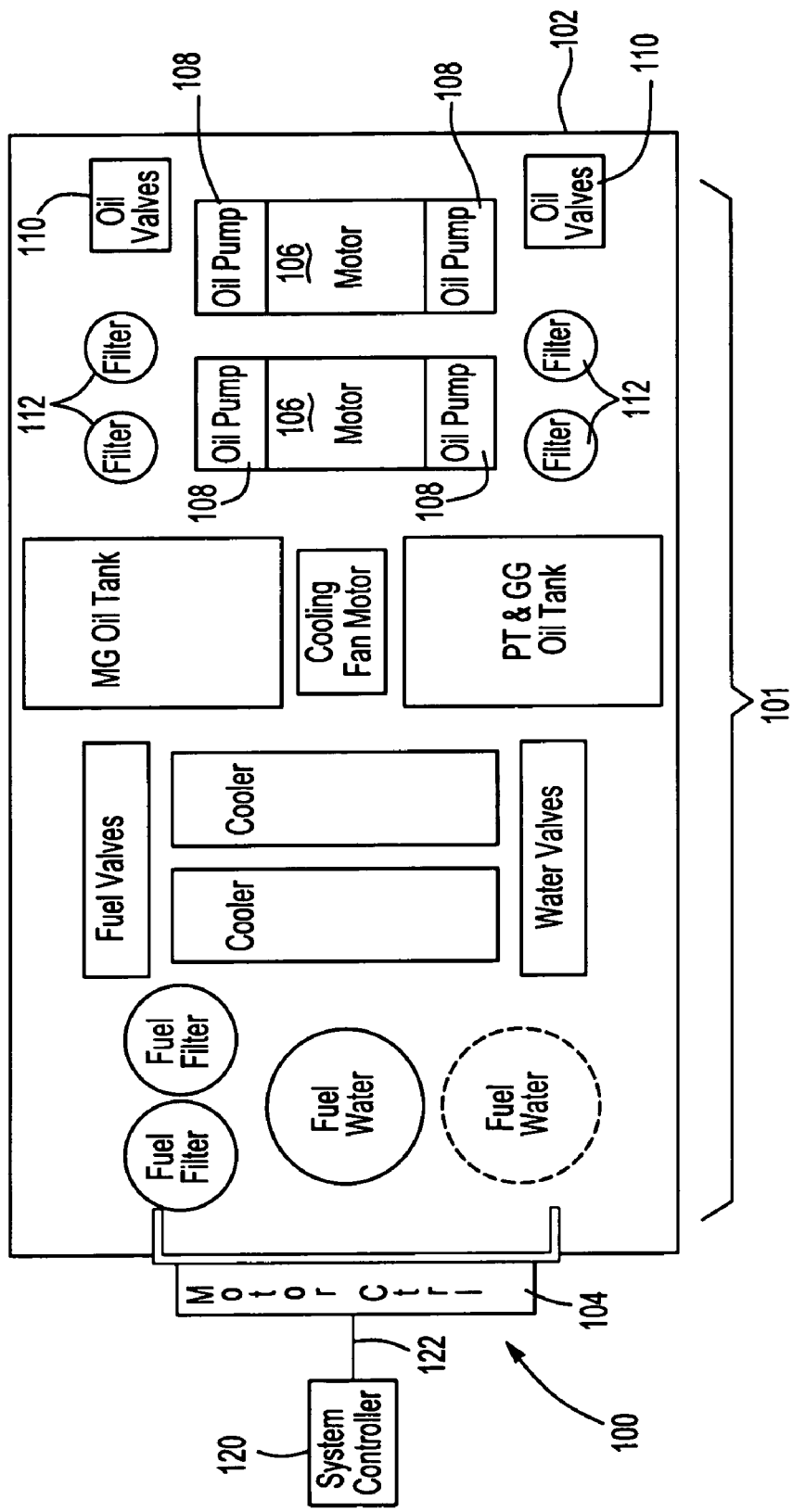
FIG. 1 is a representative plan view of one example of an integrated skid illustrating the concepts of one embodiment of the invention.
Figure 2:
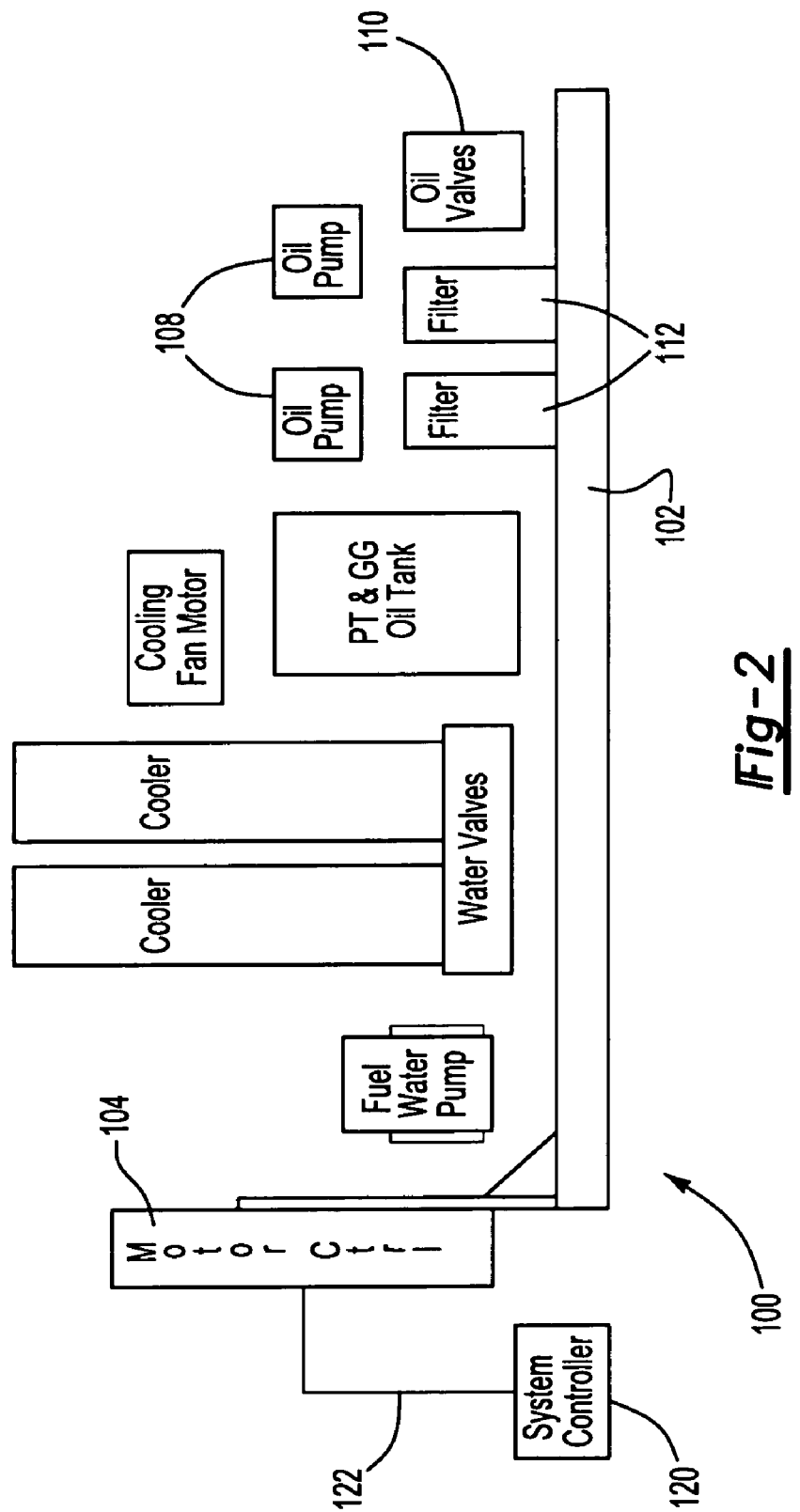
FIG. 2 is a side view of the integrated skid of FIG. 1.

FIGS. 1 and 2 are representative diagrams of an integrated skid system 100 to illustrate the broad concept of the invention. The example shown in FIGS. 1 and 2 is meant for illustrative purposes and is not meant to be limiting in any way. Those of ordinary skill in the art will understand that any number and type of system components and configurations can be used without departing from the scope of the invention.

As noted above, conventional plant systems tend to separate gas turbine engine accessory devices according to their functions into isolated skids, each skid having its own associated motors, controllers, sensors and other devices. The integrated skid system 100 shown in FIG. 1 integrates devices 101 having disparate functions onto a single skid 102 or other platform and controls these devices 101 via a single multi-motor controller 104 associated with the system 100. In the illustrated embodiment, two motors 106 and their associated devices 101 (e.g., oil pumps 108, oil valves 110, filters 112, etc.) are disposed on the same skid 102 even though they carry out different functions. The multi-motor controller 104 monitors and controls the devices 101 on the skid system 100, making it possible to control operation of a given device based on the operating states of other devices 101 on the same skid 102. As a result, devices 101 can be shared among separate engines, minimizing the total number of devices 101 needed to support the engines without sacrificing redundancy and fault-tolerance.

For example, in a conventional system, a given engine may require four motors and their associated pump components: one primary motor and one backup motor for each engine. Thus, two engines would normally require a total of four motor and associated pump components because the motors are isolated from each other and controlled independently. Integrating the components allows the total number of motors for the two engines to be reduced to three: one primary motor for each engine and a backup motor shared between the two engines, to be used on whichever engine is experiencing a motor problem. Because the multi-motor controller 104 receives sensor data from multiple engines and devices 101 and makes decisions based on the received data, it can detect which engine is having the problem and switch the backup motor to either engine. Similar device sharing can be implemented for other devices 101, such as water and fuel pumps, in the system 100. Thus, the intelligent capability provided by the multi-motor controller 104 allows control over device operation to enable sharing of devices 101 among engines.

In the illustrated embodiment, the multi-motor controller 104 communicates with a system controller 120 via a simple connector 122, such as a serial or Ethernet-type connection. In this embodiment, the decision-making functions regarding how to control a device (e.g., a motor operating speed) are conducted by the multi-motor controller 104, while the actual plant control is conducted by the system controller 120. In this way, the system controller 120 can be kept very simple. Separating the plant control functions from the intelligent functions also allows a single system controller 120 to control devices 101 associated with a plurality of multi-motor controllers 104 with a minimal increase in the number of connections in the overall system, on the order of the number of additional integrated skids 100 rather than the number of additional devices 101.

The multi-motor controller 104 itself has the intelligence and the power needed to control the various devices 101, such as the motors, in the skid system 100. The devices 101 in the skid system 100 have sensors that feed sensor data to the multi-motor controller 104 for the controller 104 to analyze. The multi-motor controller 104 may then, if needed, instruct the system controller 120 to actually control the devices 101 based on the analysis it conducted. As a result, the multi-motor controller 104 can conduct fault-tolerance and correction if the sensor data obtained from the devices 101 indicates the presence of a potential problem.

The intelligent control provided by the multi-motor controller 104 is particularly useful in minimizing the number of devices needed to control critical functions. For example, conventional turbine engine systems include both two AC motors and a backup DC motor to ensure that oil continues to be pumped to the generator by the DC motor in the case of an AC power failure, preventing the generator bearings from being damaged. Current system controllers 120 simply turn on the DC motor in reaction to the power failure. By contrast, the multi-motor controller 104 in the inventive system makes it possible to use a motor that can run from both an AC source and a DC source so that the motor can be simply switched to operate from the DC source in case the multi-motor controller 104 detects an AC power failure. Thus, the intelligent control provided by the multi-motor controller 104 allows all of the DC pumps and motors to be eliminated completely from the system 100, greatly reducing the total hardware in the system 100. Those of ordinary skill in the art will be able to see that the multi-motor controller 104 makes other hardware reductions possible within the scope of the invention.

Figure 3:
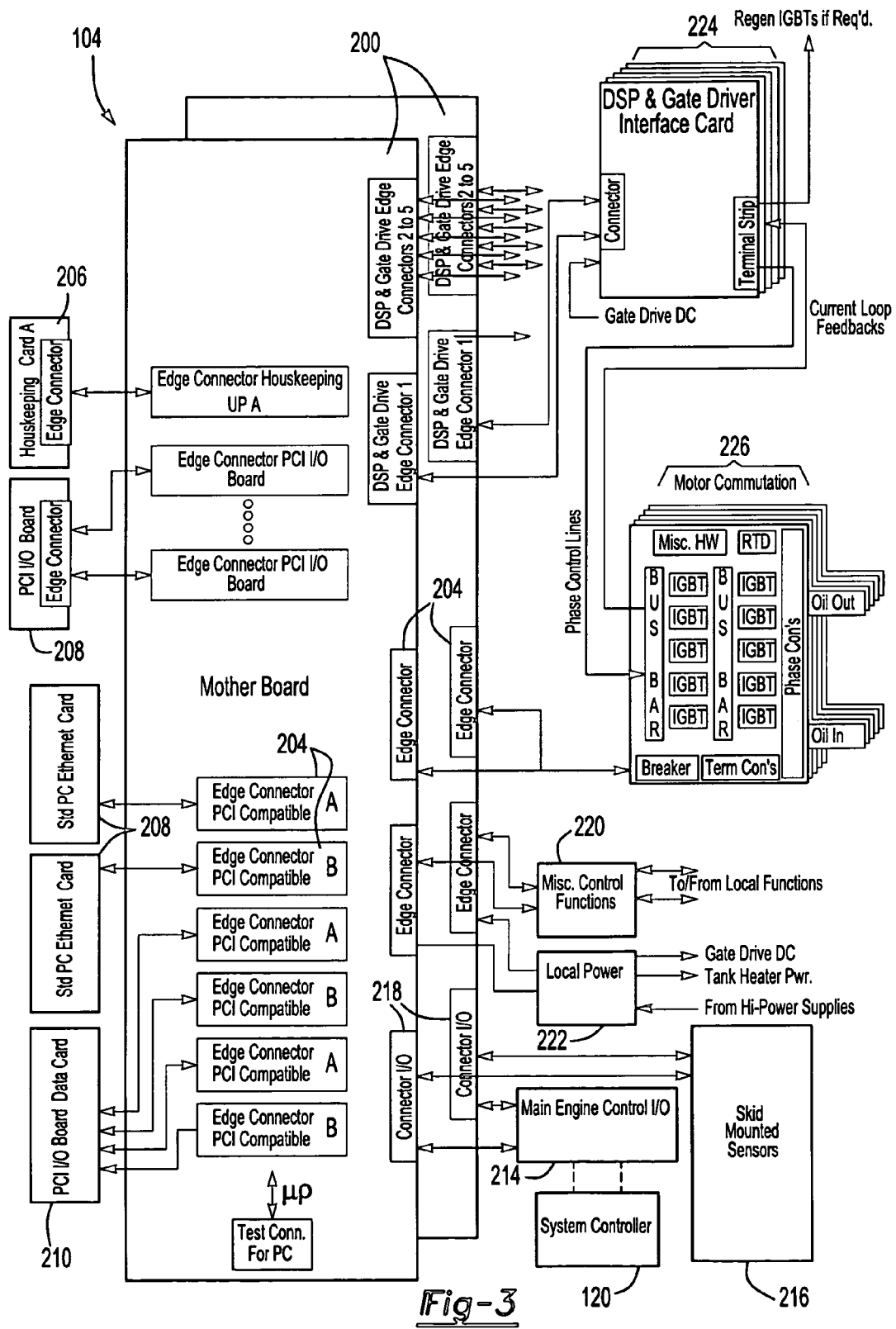
FIG. 3 is a representative diagram of a multi-motor controller according to one embodiment of the invention.

FIG. 3 illustrates an example of one particular embodiment of the multi-motor controller 104 that may be used in the inventive system 100. The controller 104 is not limited to the illustrated configuration, and other configurations may be used without departing from the scope of the invention. In the illustrated embodiment, the multi-motor controller 104 is a modular controller that allows boards to be inserted and removed based on the specific devices 101 on the skid 100. A channel rack 200 has edge connectors 204 that can accommodate various plug-ins and controller cards to provide various functionalities to the controller 104. In the illustrated embodiment, for example, a housekeeping card 206 and a PCI I/O board 208 may be plugged into the channel rack 200. As shown in FIG. 3, other boards, such as a PC Ethernet card 210 or a standard PCI I/O data card 212, may also be connected to the channel rack 200 if desired.

A main engine control I/O card 214 acts as an interface between the multi-motor controller 104 and the system controller 120. The multi-motor controller 104 can send instructions via main engine control I/O card 214 to the system controller 120 to, for example, turn devices on and off. The system controller 120 may also send information (e.g., requested engine speed, engine mode status, start, stop, synchronize, load shed, synchronous condensing, etc.) to the multi-motor controller 104 via the main engine control I/O card 214.

Each of the devices 101 in the skid system 100 may have its own associated sensor 216 to provide information on the health and operating state of the device 101. Collectively, the sensors 216 may collectively feed data into a connector I/O port 218 on the rack 200, providing the data needed for the controller 104 to decide how to control the devices. The particular sensor devices 216 that are needed in a given system 100 can vary depending on the specific devices on the skid. For example, the input/output devices 216 may correspond to pressure and temperature flow transducers, current meters, DC meters, AC meters, etc., all of which can be plugged into the connector I/O port 218. This plug-in capability further illustrates the flexible, modular nature of the multi-motor controller 104 because any combination of devices 216 can be included in the system 100 without complicated modifications to the system 100 itself.

Various miscellaneous control functions 220 may be included to control operation of devices that do not require intelligent control, such as constant speed motors, heaters, fans, relays, or other smaller devices that are either on or off (i.e., binary) rather than variable. This allows processing resources in the controller 104 to be reserved for variable control devices, such as variable speed motors.

A local power supply module 222 may also be connected to the rack 200 to act as a switch to backup DC power supply that is tapped in case of an AC power failure.

As noted above, a given skid system 100 may have multiple motors 106 (e.g., an oil system motor, a water system motor, a fuel system motor, a ventilator motor, etc.). The embodiment shown in FIG. 3 includes a digital signal processor (DSP) and gate driver interface card 224. Each of these cards 224 is connected to the rack 200 by their own dedicated edge connectors 204 to link the rack 200 with a corresponding motor commutation module 226. Although the illustrated embodiment includes one DSP card 224 and motor commutation module 226 with each motor, some sharing among the cards 224 and modules 226 can be arranged among multiple motors if selected motors do not operate at the same time.

For example, a starter motor and a fuel motor would require separate cards 224 and modules 226 because they are used simultaneously when an engine is started. The starter motor and a motor that controls water injection into the motor, however, can share a single card 224 and module 226 because water injection is not conducted during the engine start operation. As another example, a main system and a backup system may share the same card 224 and module 226 because the backup system will only operate if the main system fails.

The DSP and gate driver interface cards 224 act as the motor controllers and the motor commutation modules 226 act as the switches that actually switch different legs of the motor to cause the motor to turn at a given speed. The DSP and gate driver interface cards 224 calculate the desired motor speed, current limits, and commutation pattern required to properly rotate the specific motor type being used (i.e., induction motor, permanent magnet motor, etc.). The DSP and gate driver interface cards 224 can be programmed to drive various types and size of motors, if desired. The motor commutation module 226 contains high power bus bars and high power switches, such as insulated gate bipolar transistors (IGBT) that actually switch the current on and off to the various phases of the motor being controlled.

By combining separate system devices into an integrated skid package and controlling the devices via a common intelligent multi-motor controller, the invention provides improved system functionality with fewer devices in fluid handling systems. Rather than relying on the system controller alone, which simply turns the motors and associated devices on and off, the intelligent controller used in the invention is able to make decisions on when the motors will go on and off based on the operation of other motors and devices in the system. As a result, the inventive system provides redundancy and fault-tolerance via intelligent device control rather than through extra redundant devices. Moreover, moving devices having different functions onto a common skid reduces the overall plant footprint, making the system simpler and less costly to implement.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A controller for controlling a plurality of motors in a fluid handling system, comprising:
   a connector input/output port that communicates with at least one sensor in the fluid handling system to obtain sensor data;
   at least one digital signal processor (DSP) and gate driver interface that evaluates the sensor data and generates a control signal based on the sensor data;
   at least one commutation module in communication with said at least one DSP and gate driver interface, wherein said at least one commutation module controls at least one motor based on the control signal;
   said at least one motor receiving AC power under normal conditions;
   a local power supply that selectively powers the motors; and
   the local power supply is a DC backup power supply, and wherein said at least one DSP and gate driver switches to the DC backup power supply to supply power to said at least one motor in the event of a main power failure.

2. The controller of claim 1, wherein each DSP and gate driver interface has a corresponding commutation module.

3. The controller of claim 1, wherein each of said plurality of motors has a corresponding DSP and gate driver interface and a corresponding commutation module.

4. The controller of claim 1, wherein at least one of said plurality of motors shares one DSP and gate driver interface and one motor commutation module.

5. The controller of claim 1, wherein at least one of said plurality of motors is a binary-function motor, and wherein the controller further comprises a card to control said at least one binary-function motor.

6. The controller of claim 5, wherein at least one of said plurality of motors is a variable speed motor, and wherein said at least one commutation module controls at least one variable-speed motor.

* * * * *